Jan. 17, 1933.  M. T. LIANG  1,894,776
SPRING SUSPENSION FOR AUTOMOBILE CHASSIS
Filed July 25, 1928    2 Sheets-Sheet 2
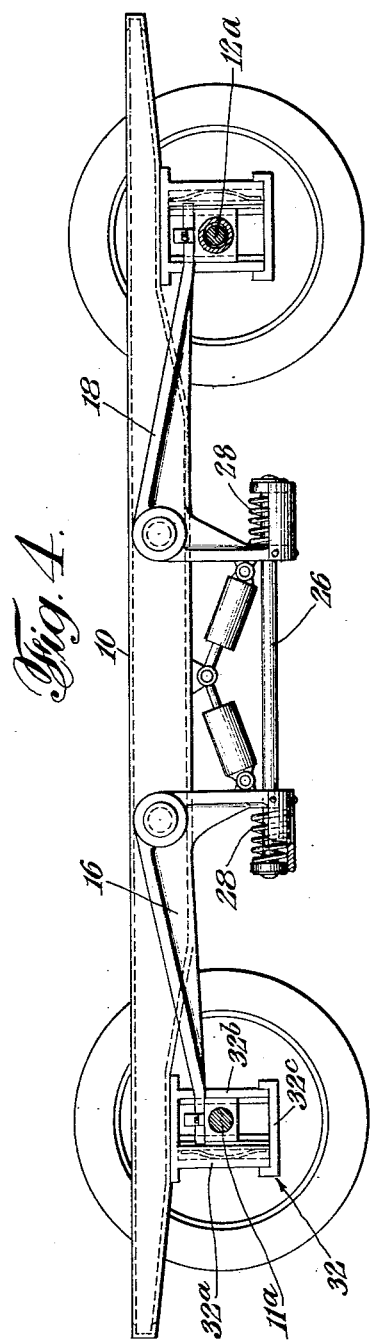
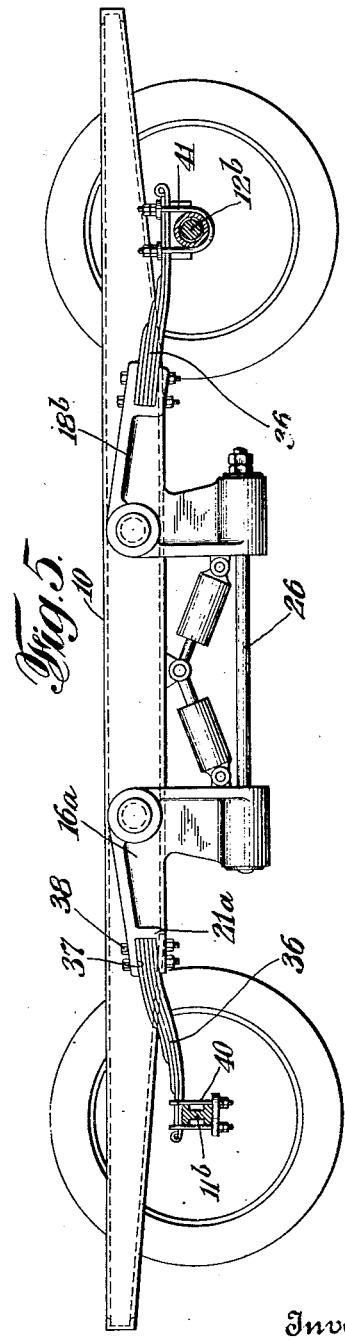
Inventor
M. T. Liang
By his Attorneys
Townsend & Decker.

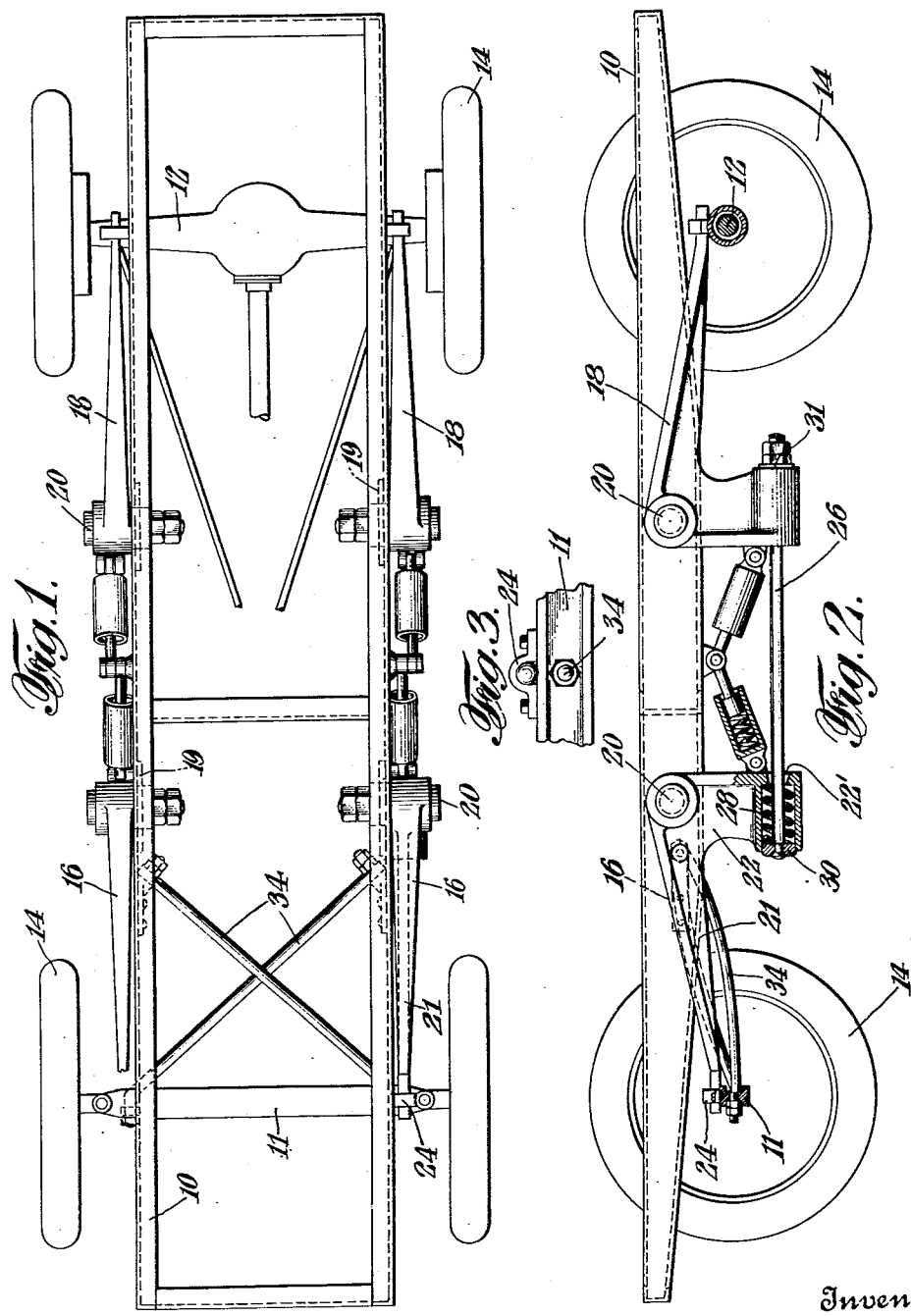

Patented Jan. 17, 1933

1,894,776

UNITED STATES PATENT OFFICE

MING T. LIANG, OF TIENTSIN, CHINA

SPRING SUSPENSION FOR AUTOMOBILE CHASSIS

Application filed July 25, 1928. Serial No. 295,240.

This invention relates to improvements in spring suspensions for vehicles.

It is a primary object of the invention to provide an improved spring suspension which will equalize the rod shock between the forward and rearward portions of the vehicle and thus reduce the total shock transmitted to the vehicle when an obstruction is encountered.

It is a further object to reduce the unsprung weight of the vehicle by supporting the spring suspension devices mainly upon the spring supported portion of the vehicle frame.

These and other objects will appear more fully from the following description when considered in connection with the drawings in which:

Fig. 1 is a plan view of one form of my invention.

Fig. 2 is an elevational view thereof, parts being in section.

Fig. 3 is a detailed view of the connection between the supporting levers and axles.

Fig. 4 is an elevational view of a modification of my invention.

Fig. 5 is a similar view of a different modification thereof.

Referring first to Figs. 1 to 3, there are shown portions of vehicle such for example as the customary chassis 10 axles 11 and 12, wheels 14, etc. These devices may obviously be of any usual or preferred construction and form no part of my present invention.

The vehicle suspension according to my present invention includes the forward and rearward levers 16 and 18 positioned at opposite sides of the vehicle and adjacent the forward and rearward portions thereof. The supporting levers 16, 18 are pivotally mounted upon the vehicle body or chassis as indicated at 20, the pivotal supports at 20 being of sturdy construction since the levers 16 and 18 maintain the axles against transverse movement with respect to the vehicle frame. The frame is preferably reinforced as indicated at 19 for strengthening the pivot support 20. Levers 16 and 18 are formed with longitudinally extending portions 21 extending into positions to be supported upon the axles 11 and 12 and with angular or projecting portions 22 for receiving the spring supporting devices. The outer or free ends of the lever portions 21 are, according to the first form of the invention, provided with rocking supports as indicated at 24 to permit relative rocking movement between the levers 16 and 18 and the axles 11 and 12 as indicated particularly in Fig. 3, the connection 24 preventing transverse movement of the axles relatively to the supporting levers. Obviously any other type of rocking connection may be employed.

The projecting portions 22 of the levers 16, 18 on the same side of the vehicle are connected as by means of the rod 26 shown as extending through openings in the levers 22, the levers being provided with suitable housings for compression coil springs 28 positioned between the projections 30 and 31 of the rod 26. Angular movement of one lever 16 or 18 is thus transmitted to and equalized by the other of said levers. One of the projections or stops 30, 31 may be in the form of an adjustable nut if desired, as shown at 31, so as to permit adjustment of the tension of the springs and to vary the distance between the axles 11 and 12 and the chassis or body 10.

The openings 22′ through the lever 22 and which receive the rods 26 may be elongated vertically to permit pivotal movement between the levers 22 and rod 26 as will be understood. The supporting levers 16, 18 may be maintained yieldingly in their normal positions with the axles spaced from the chassis frame as shown in the drawings by means of any type of anchoring device which will yieldingly resist movements of these levers from their normal positions. One such device is illustrated in the drawings and includes the compression springs and linkage 29 connected between the outer ends of the levers 22 and the body or chassis 10.

In Figs. 1 and 2 the axles 11 are guided in their vertical movement by means of radius or spacing rods 34 which may be rigidly attached to the axles at their outer ends and pivotally attached to the chassis or other body frame at their inner ends as shown.

The rods 34 may be crossed so as to extend from one side of the frame to the other end of the axle in order to more securely brace the axle against any except vertical movement. The rods 34 are accordingly bowed, one upwardly and the other downwardly, so as to avoid interference between the same during rocking of the axle with respect to the chassis frame.

The rearward axle of the vehicle may employ the usual torque tube or torque rods which together with the differential and drive shaft housings will adequately serve to brace the axle so that the additional rods 34 will not ordinarily be required for this axle.

In Fig. 4 the supporting members 16 to 18 and connecting rods 26, springs 28, etc., are the same as in Figs. 1 and 2 above.

The axles 11a and 12a are guided in their vertical movements by the fixed guides 32 formed with the vertical members 32a and 32b positioned on opposite sides of the axles 11a and with the transverse members 32c positioned beneath the axle, the guides serving to prevent rotation of the axles 11 and also to prevent any bodily displacement of the axles except vertical movement thereof in its movement relatively to the chassis.

The form of the invention shown in Fig. 5 includes the cantilever springs 36 rigidly attached to the outer ends 21a of the levers 16a and 18b. The springs may be rigidly attached to the levers in any preferred manner as by being received within the slotted ends 37 thereof and clamped in position as by means of bolts 38. The outer ends of the springs 36 in this form of the invention may be rigidly attached to the forward axle 11b as by means of clamps 40 and to the rearward axle 12b by the usual saddle 41, the elasticity of the springs 36 serving the function of the rocking connection 24 in the forms of the invention disclosed above.

The construction of the levers 16a, 18b, springs 28, rods 26, etc., may be otherwise the same as in the constructions referred to above.

The use of the above described apparatus will be readily understood from the above description. When the wheels of the vehicle supplied with my improved spring suspension encounter an obstruction in the road the wheels may yield upwardly toward the chassis 10 thus causing a pivotal movement of the levers 16 or 18 and a corresponding compression of springs 28. Such movement of either the forward or rearward wheels is transmitted through the levers 16 or 18 to the pivot 20 of the lever associated with the wheel which meets the obstruction but due to the connection between the extensions 22 of the forward and rearward levers 16 and 18 the reaction is borne in part by the other said lever 18 or 16 so that the shock is thus divided over the whole vehicle and dissipated to a large extent.

The axles 11 or 12 may move vertically with respect to the body frame but are prevented from unintended turning or bodily movement by means of the vertical guides, radius rods or springs shown in the various forms of the invention assisted by the stabilizing influence of levers 16, 18, 16a, etc. which levers tend to prevent lateral movement of the axles with respect to the frame.

Having now described my invention I claim:

1. In a vehicle provided with a chassis frame and front and rear axles, spring suspension devices for the axles arranged on each side of the chassis frame, each suspension device comprising a pair of bell-crank levers each having a longitudinally extending arm and a substantially vertical arm, said levers being pivotally connected at the angle of intersection of their arms to the chassis frame adjacent to and on opposite sides of the transverse center thereof, and said levers having their longitudinally extending arms respectively connected to the front and rear axles and having their substantially vertical arms provided with housings, sliding abutments in the housings on the vertical lever arms, a longitudinally movable rod extending between and into the housings and connecting the abutments, springs operatively arranged in the housings between the housings and abutments and acting on the abutments, the rod and the levers to yieldingly oppose relative movement between the chassis frame and axles toward each other, and a pair of angularly arranged auxiliary spring devices disposed between and cooperating with each pair of suspension levers and comprising cylinders, pistons in said cylinders and springs in said cylinders acting on the pistons, said auxiliary spring devices being jointed to the chassis frame and vertical arms of the levers for pivotal and telescopic movements and providing double acting spring means yieldingly opposing the aforesaid movements of the levers under the action of the first-named springs.

2. In a vehicle provided with a chassis frame and front and rear axles, spring suspension devices for the axles arranged on each side of the chassis frame, each suspension device comprising a pair of bell-crank levers each having a longitudinally extending arm and a substantially vertical arm, said levers being pivotally connected at the angle of intersection of their arms to the chassis frame adjacent to and on opposite sides of the transverse center thereof, and said levers having their longitudinally extending arms respectively connected to the front and rear axles and having their substantially vertical arms provided with housings, sliding abutments in the housings on the vertical lever arms, a longitudinally movable rod extending between and into the housings and connecting the abutments, springs operatively arranged in the housings between the housings and abutments, and acting on the abutments, levers and rod, to yieldingly oppose relative movement between the chassis frame and axles toward each other, means adapting said pistons to be relatively adjusted to regulate the tension of the springs and the relative positions of the vertical arms of the levers, and a pair of angularly arranged auxiliary spring devices disposed between and cooperating with each pair of suspension levers and comprising cylinders, pistons in said cylinders and springs in said cylinders acting on the pistons, said auxiliary spring devices being jointed to the chassis frame and vertical arms of the levers for pivotal and telescopic movements and providing double acting spring means yieldingly opposing the aforesaid movements of the levers under the action of the first-named springs.

Signed at New York, in the county of New York and State of New York, this 20th day of July, A. D. 1928.

MING T. LIANG.